Oct. 16, 1951     J. E. PENICK     2,571,380
METHOD OF REGENERATING ADSORPTIVE MATERIAL
Filed June 23, 1948
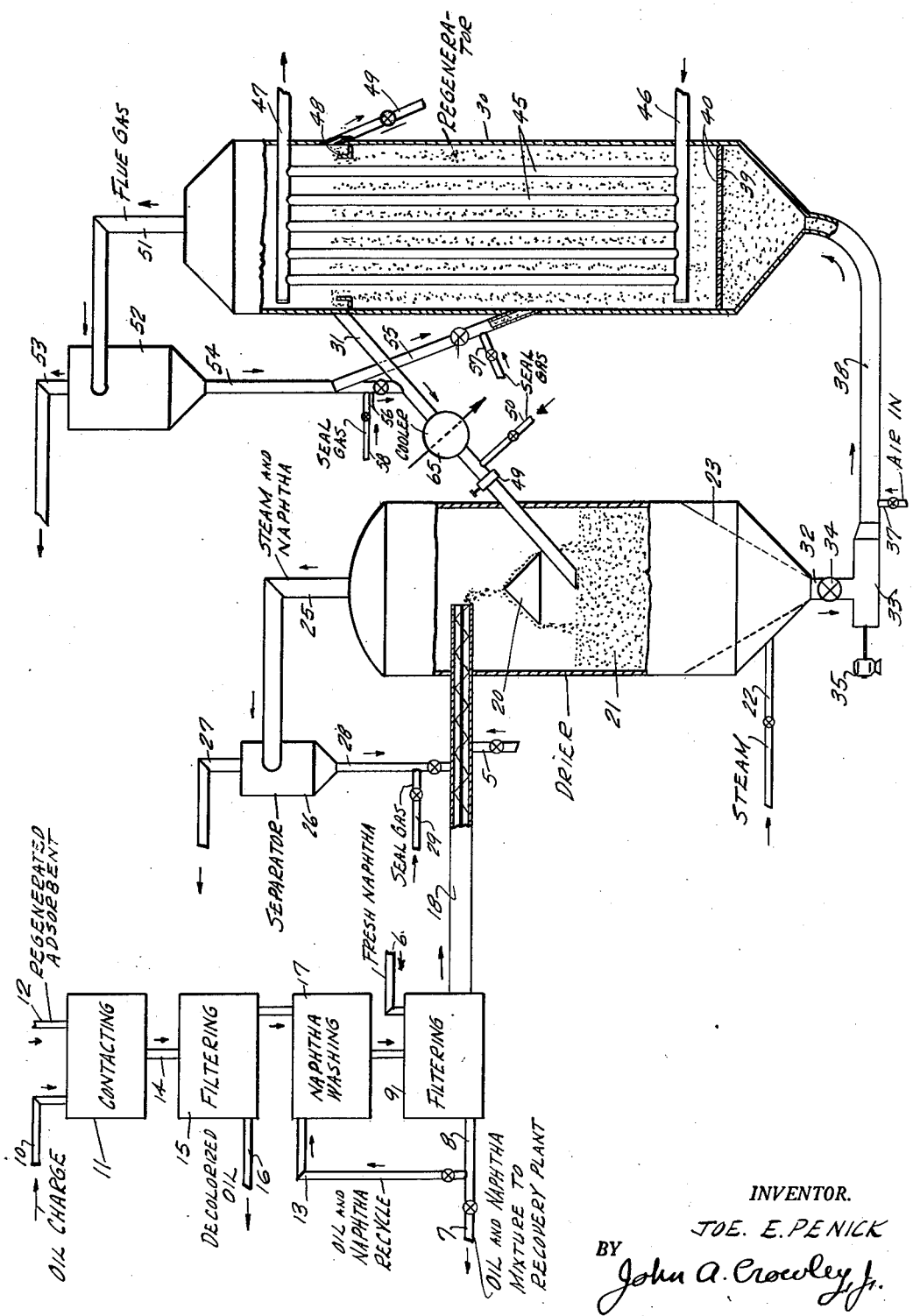
INVENTOR.
JOE. E. PENICK
BY
John A. Crowley Jr.
AGENT OR ATTORNEY Patented Oct. 16, 1951

2,571,380

UNITED STATES PATENT OFFICE 2,571,380

METHOD OF REGENERATING ADSORPTIVE MATERIAL

Joe E. Penick, Woodbury, N. J., assignor to Socony-Vacuum Oil Company, Incorporated, a corporation of New York Application June 23, 1948, Serial No. 34,589

2 Claims. (Cl. 252—417)

This invention pertains to the decolorization and treating of oils with solid adsorbent materials and is directed more particularly to a method for the revivification of pulverized adsorbent contact materials which have become spent by use for treating of liquid oils.

Typical of the treating processes for which such adsorbents are employed is the contact refining of petroleum lubricating oils to remove gum-forming compounds, color bodies, and other objectionable material therefrom. Other processes are the refining of vegetable oils, sugar liquors, waxes, resins, etc. with finely divided adsorbents.

The adsorbent contact materials involved in such processes may take the form of clays such as fuller's earth, bauxites, silica gels, bentonite, montmorillonites, activated charcoal, and certain synthetic associations of silica and alumina to which other materials such as certatin metallic oxides may be added. The adsorbent contact materials employed in contact treating processes should have a grain size which will pass through a 100 mesh Tyler screen and preferably within the range about 150-400 mesh size.

In all of such processes the adsorbent becomes spent due to the deposition thereon of carbonaceous contaminants and some oil. A portion of the coloring matter can be removed by use of solvents such as naphtha, low boiling alcohols and ketones. However, solvent treatment of the spent adsorbents are not always successful in fully revivifying the adsorbent and the procedure is generally too costly for practical commercial practice. It is the usual custom to subject the spent adsorbent material to a combination of steaming and naphtha washing to effect removal of oil constituents from the adsorbent, after which the naphtha may be distilled off in a rotary drum kiln followed by burning of the contaminant in still another mechanically driven kiln. This procedure has not proved satisfactory because of the high heat cost involved in distilling the naphtha from the adsorbent particles and because the efficiency of the adsorbent for treating oils was to a great extent lost in the burning regeneration. The latter difficulty is in a large part due to the impossibility of providing adequate temperature control of the adsorbent by burning regeneration in rotary drum kilns and similar kilns employed commercially.

A major object of this invention is the provision of an improved process for revivifying finely divided adsorbent contact materials which have become spent by use in the contact treatment of liquid oils.

Another object is the provision of an economical and practical method for recovering vaporizable hydrocarbons from spent adsorbent contact materials and for removal of carbonaceous contaminant deposits from such contact materials by burning.

These and other objects of this invention will become apparent as the description thereof proceeds read in conjunction with the accompanying drawing which is an elevational view, partially in section of one embodiment of my invention.

Referring now to the drawing, the application of the method of this invention to a process for decolorization of petroleum oils will be described by way of example. Heated liquid hydrocarbon oil is introduced through pipe 10 into contacting zone 11 wherein it is contacted with pulverized regenerated adsorbent introduced through pipe 12. The temperature, pressure and time in the contacting zone and the relative amounts of oil and adsorbent employed in zone 11 vary depending upon the particular oil contacted and the efficiency of the adsorbent employed. In general, the contacting temperatures may vary from about 400° F. to about 700° F., the contacting residence time may vary from 5 to 20 minutes, the pressure may range from about 0 to 15 pounds per square inch gauge and the amount of adsorbent employed may vary from 1 to 25 percent by weight of the oil charge. The contacted oil and adsorbent which has become spent by deposition of a carbonaceous contaminant thereon are passed through pipe 14 to a filtering zone 15 wherein the adsorbent and treated oil are separated. If desired, the oil may be cooled somewhat before charging to the filtering zone. The filtering zone may consist of any of a number of conventional filters used for this purpose. This filter may be of the plate and frame type or preferably of the continuous rotary drum type. The treated oil is withdrawn to storage through pipe 16 and the filtered adsorbent is passed to a washing zone 17 wherein it is washed to remove oil by a mixed solution of oil and naphtha entering via pipe 13 from filtering zone 9. If desired, fresh naphtha may be employed at this point. The resulting slurry formed in zone 17 passes to filtering zone 9 wherein the liquid is filtered from the adsorbent and removed via pipe 8. A portion of this liquid consisting of naphtha and recovered oil is withdrawn to a conventional oil recovery system via pipe 7 and the remainder is recycled to washing zone 17. Fresh naphtha is added via pipe 6 to wash further oil from the adsorbent in the filtering zone. The adsorbent which may be saturated with naphtha is conveyed by means of screw conveyor 18 into the upper section of vertical drier 19. It will be understood that the oil recovery procedure may be modified from that described above. For example, the wash naphtha may be partially removed from the adsorbent by draining and steaming instead of by filtering. The wash naphtha employed may boil within the range about 175–500° F. for example. The spent material supplied to the drier may as an example contain 50% by weight naphtha and 5.0% by weight higher boiling vaporizable oil and 8.0% by weight nonvaporizable carbonaceous contaminant (measured as carbon). The spent adsorbent contact material falls downwardly onto a conical baffle 20 by which it is distributed onto a bed of said adsorbent 21 within the drier. An inert stripping gas such as steam or flue gas is introduced into the lower section of the drier via pipe 22 and is distributed into the bed by means of the perforated false bottom 23. This gas may be preheated to a temperature of the order of 300–700° F. The gas then passes upwardly through the bed of adsorbent 21 to help strip off the vaporizable hydrocarbons (principally naphtha with or without a small amount of higher boiling oil). The rate of gas flow is controlled to maintain the bed in a fluidized state, that is in a state of ebullient motion resembling a boiling fluid. Since as will be shown hereinafter the gas introduced via pipe 22 is not relied upon to supply the heat required for hydrocarbon vaporization and adsorbent heating a low rate of gas flow may be maintained in the drier thereby permitting maintenance of a dense phase fluidized bed of adsorbent. In general, the linear velocity of gas flow in the drier should be below about 3.0 feet per second so as to provide an adsorbent plus gas density of the order of 5–35 pounds per cubic foot within the bed 21. The mixed stripping gas and vaporizable hydrocarbons are substantially disengaged from the contact material in the upper section of the drier 19 and are withdrawn from the top thereof via pipe 25. A small amount of suspended powdered material is entrained in the effluent gas stream and is separated therefrom in the cyclone separator 26. The separated gas is withdrawn via pipe 27 to a hydrocarbon recovery system of conventional type (not shown). The separated adsorbent settles as an aerated stream through conduit 28 into the conveyor 18 by which it is returned to drier 19. A seal and aeration gas is introduced into the lower section of conduit 28 via pipe 29.

A stream of hot regenerated adsorbent from a regenerator 30 is supplied as a gravity flowing aerated stream via conduit 31 onto the bed of adsorbent in drier 19. The hot regenerated adsorbent which should exist at a temperature above that required to initiate contaminant combustion and usually within the range about 750–1300° F. mixes with the cooler spent adsorbent which may enter the vessel 19 at a temperature of the order of atmospheric to 300° F. and heats it to a temperature suitable for vaporization of the deposited vaporizable hydrocarbons and also suitable for subsequent initiation of burning of the deposited carbonaceous contaminant remaining after removal of the vaporizable hydrocarbons. The mixed adsorbent existing at a temperature near that required for initiation of the contaminant combustion, for example, 700° F., passes from the bottom of drier 19 via conduit 32 into the solids pump 33 at a rate regulated by a rotary valve or metering arrangement 34. The solids-pump or mixer 33 is driven from any suitable source of power such as motor 35. The solids-pump device may be an arrangement such as that furnished by the Fuller Kenyon Company and described in detail in United States Patent 1,553,539 and a modification thereof in United States Patent 2,102,330. If desired, an air conveyor type of device well known to the art may be employed instead of the Fuller Kenyon device. The air conveyor device utilizes considerably more air to suspend the solid particles than is employed in the device of the Fuller Kenyon patent. The solid adsorbent is dispersed in air or other suitable carrier gas supplied via pipe 37 and is conducted via conduit 38 into the lower section of the regenerator 30. The stream is distributed by means of orifice plate 39 which is provided with a plurality of uniformly distributed openings 40. The oxygen containing gas passes upwardly through the regenerator 30 at a low velocity, preferably sufficiently low so that there will be a considerable accumulation of adsorbent in the burning zone. For example, lower velocities of the order of 1 to 2 feet per second are suitable for adsorbents of 200–400 mesh and higher velocities for coarser adsorbents. Under these conditions the adsorbent tends to settle with respect to the upwardly flowing gas stream resulting in a suspended dense turbulent mass of adsorbent within the regenerator. Preferably for clay type adsorbents the density of the adsorbent plus vapors may be from about 5 to 35 pounds per cubic foot within the regeneration zone. The contact material may be maintained below a heat damaging temperature by the passage of a suitable cooling fluid through the heat transfer tubes 45. The fluid may be supplied to tubes 45 by header 46 and withdrawn therefrom via header 47. Exemplary of suitable cooling fluids are steam, air, water under pressure, molten alloys and certain molten inorganic salts such as mixtures of the nitrates and nitrates of potassium. A stream of regenerated adsorbent is withdrawn via pipe 49 from the circular trough 48 provided in the upper section of the regenerator. The regenerated adsorbent so withdrawn may be cooled and is then suitable for reuse in contacting zone 11.

A second stream of hot regenerated adsorbent passes via conduit 31 to drier 19 as stated hereinabove. The rate of flow of this stream may be controlled by valve 49 near its lower end. An inert seal gas such as steam or flue gas is supplied via pipe 50 into the lower section of conduit 31 at a rate controlled to maintain the solid material in a flowable condition while maintaining an inert gas seal between the drier and the regenerator.

Gaseous regeneration products containing a small amount of entrained powdered material are passed from the top of the regenerator 30 via pipe 51 to a cyclone separator 52 wherein the entrained solids are separated. The gas is withdrawn from the separator via pipe 53 and the settled fines are passed via conduits 54 and 55 to the regenerator or by conduits 54 and 56 to conduit 31 supplying the drier as desired. An inert seal gas may be supplied into the lower sections of pipes 55 and 56 by pipes 57 and 58 respectively so as to maintain the adsorbent fines in a flowable condition.

It will be readily understood by those skilled in the related art that the system described above may be modified in a number of respects without departure from the general spirit and scope of this invention. For example, conventional methods other than those shown may be utilized for effecting distribution and withdrawal of gases and solids in the drier and regenerator and for the separation of entrained powdered adsorbent from the effluent gas streams and for return of the separated solids to the drier or regenerator vessels.

According to a preferred modification of this invention, the amount and temperature of hot regenerated adsorbent supplied to the drying zone are not only suitable for providing at least most of the heat required to effect vaporization of the vaporizable hydrocarbons present in the spent adsorbent charge and to heat the spent adsorbent to a temperature suitable for subsequent initiation of burning of the nonvaporizable deposits in the spent adsorbent but also to so dilute the proportion of nonvaporizable deposit to total adsorbent in the mixture leaving the drier as to provide a sensible heat adsorption capacity in the mixed adsorbent which is at least equal to the total net heat release due to burning in the regeneration zone over radiation losses and heat removal in the effluent regeneration gas. This permits elimination of the use of heat transfer tubes and extraneous heat exchange fluids in the regeneration zone. In order to accomplish this latter operation sufficient hot regenerated adsorbent should be supplied to the drier to provide an average nonvaporizable contaminant deposit on the mixed adsorbent leaving the drier and entering the regenerator in which the carbon content is of the order of 0.2 to 0.6 percent by weight of the adsorbent. In order to accomplish dilution to this extent in operations wherein the carbon content on the spent adsorbent is high (of the order of 4 percent by weight and upwards, for example), it is desirable to partially cool the hot regenerated adsorbent in cooler 65 before supply to the drier, thereby permitting the desired amount of dilution while still providing a final mixed adsorbent temperature which is near the minimum temperature required to initiate combustion of the nonvaporizable contaminant deposit. For example, the hot regenerated adsorbent may be withdrawn from the regeneration zone at about 1150° F. and cooled to about 950° F. in cooler 65 before supply to the drying zone. Alternatively instead of employing the cooler 65, the proportion of vaporizable hydrocarbons such as naphtha in the adsorbent charge to the drier may be increased and regulated as required to provide a thermally balanced operation between the drier and kiln without the necessity for heat removal by an external heat exchange fluid at any point in the system. This is possible due to the fact that the vaporization of additional naphtha in drier 21 does not materially increase the amount of nonvaporizable carbonaceous material left on the adsorbent leaving the drier. The additional naphtha may be added at pipe 5 or may be added by regulation of the filtering operation in zone 9.

It will be noted that by the method of this invention, the naphtha and other vaporizable hydrocarbons are removed from the adsorbent and recovered in nonoxidized condition and the spent adsorbent is heated to a temperature suitable for commencing the burning of the nonvaporizable contaminant deposits without the large external heat requirements which are characteristic of the methods of the prior art. By the method of this invention the adsorbent drying and preheating steps are accomplished by means of heat liberated during the regeneration step. Moreover, the heat requirements of the drying and preheating steps are utilized in controlling the temperature of the adsorbent below a heat damaging level during the burning step. Also by the method of this invention the inefficient low temperature steam purging step which follows the naphtha washing operation in usual prior art operations has been eliminated.

It will be apparent that the operating conditions in the drier and regenerator will vary somewhat depending upon the particular adsorbent involved, but certain broad operating ranges may be set forth. In general, the spent adsorbent enters the drying zone at a temperature of the order of 50–300° F. and is heated therein to a temperature suitable for distillation of the vaporizable hydrocarbons which is usually of the order of 400–600° F. Preferably the adsorbent should be heated to a temperature near that required to initiate contaminant combustion in the regeneration zone, i. e., about 650–800° F. At least most of the heat required for so heating the spent adsorbent and for vaporizing the hydrocarbons thereon is supplied by the hot regenerated adsorbent which enters the drier at a temperature within the range about 800–1300° F.

The ratio of hot regenerated to spent adsorbent charged to the drier varies within the range about 0.3 to 6 parts of hot regenerated adsorbent for each part by weight of spent adsorbent depending on the temperature of the solids before mixing and upon the final desired temperature and upon the amount of vaporizable hydrocarbons present on the spent adsorbent.

In the regeneration zone the temperature of the absorbent should range from an initial temperature of the order of 650–800° F. to a final maximum temperature which is below that which would cause heat damage to the absorbent. For natural clays the heat damaging temperature is of the order of 1100–1200° F. while for synthetic adsorbents the heat damaging level may be of the order of 1300–1500° F.

It will be understood that the specific embodiments of this invention and examples of operation described in detail hereinabove are intended by way of illustration and not by way of limitation and this invention is not to be construed as limited thereby except as it may be limited by the following claims.

I claim:

1. The method of revivifying finely divided powdered adsorbent contact material which has become deactivated by liquid phase contact with an oil in a decolorization process which comprises: subjecting the spent adsorbent bearing oily material and non-vaporizable carbonaceous deposits to washing with a petroleum naphtha to effect removal of the oily material, effecting a partial separation of naphtha from the adsorbent and then supplying the spent adsorbent bearing occluded naphtha and a non-vaporizable carbonaceous contaminant deposit into the upper section of a confined drying zone at a temperature substantially below that required for combustion of said carbonaceous contaminant, mixing the spent adsorbent with hot regenerated adsorbent to heat the spent adsorbent and to vaporize said naphtha, maintaining the mixed solids within said drying zone as a fluidized descending bed of powdered material by passing steam upwardly through said bed to effect fluidization thereof, effecting a substantial separation of the steam and naphtha vapors from said bed in the upper section of said drying zone and withdrawing the separated gasiform material from said zone, withdrawing the mixed regenerated adsorbent and spent contaminant bearing adsorbent substantially freed of naphtha from the lower section of said drying zone, dispersing the mixed adsorbent from said drying zone in a stream of oxidizing gas and introducing said stream into the lower section of a confined regeneration zone of large horizontal cross sectional area, passing the gas upwardly through said regeneration zone at such vertical velocity as to maintain the adsorbent as a suspended dense turbulent mass therein while effecting the burning of said contaminant, permitting the adsorbent temperature to rise due to the contaminant burning, effecting a separation of regenerated adsorbent from gaseous regeneration products in the upper section of said regeneration zone and withdrawing said gaseous products therefrom, withdrawing a portion of the hot regenerated adsorbent from said regeneration zone and cooling it for reuse in said oil decolorization process, and flowing the remainder of the regenerated adsorbent as an aerated gravitating stream from the upper section of said regeneration zone into the upper section of said drying zone to mix with said spent adsorbent as aforesaid, and maintaining the proportion of contaminant deposit to adsorbent and the temperature of the mixed adsorbent stream passing from said drying zone to said regeneration zone at levels which will permit absorption by the adsorbent of at least most of the heat released by contaminant burning without its temperature reaching a heat damaging level by controlling the amount of hot regenerated adsorbent passed from said regeneration zone to said drying zone and the amount of naphtha in the spent adsorbent supplied to said drying zone, whereby the adsorbent is regenerated without the use of a heat transfer fluid and the naphtha is vaporized from the spent adsorbent by means of heat recovered from the contaminant burning.

2. The method of revivifying finely divided powdered adsorbent contact material which has become deactivated by liquid phase contact with an oil in a decolorization process which comprises: supplying spent adsorbent existing at a temperature within the range about 50° F. to 300° F. and bearing a carbonaceous contaminant deposit and vaporizable hydrocarbons onto a bed of said adsorbent in a confined drying zone, passing an inert stripping gas upwardly through said bed to effect stripping of the vaporizable hydrocarbons from said adsorbent and at a rate controlled to maintain said bed in a turbulent fluidized state of motion resembling a boiling liquid, effecting a substantial separation of the removed vaporizable hydrocarbons and said stripping gas from said bed in the upper section of said drying zone and withdrawing the separated gasiform material from said zone, withdrawing spent adsorbent substantially freed of vaporizable hydrocarbons but containing said carbonaceous deposit from the lower section of said drying zone at a temperature above that required to initiate combustion of said contaminant, dispersing the adsorbent from said drying zone in a stream of oxidizing gas and introducing said stream into the lower section of a confined regeneration zone of large horizontal cross sectional area, passing the gas upwardly through said regeneration zone at such vertical velocity as to maintain the adsorbent as a suspended dense turbulent mass therein, while effecting the burning of said contaminant deposit, effecting a separation of the hot regenerated adsorbent from the gaseous regeneration products, passing a portion of the hot regenerated adsorbent into said drying zone to mix with said spent adsorbent, controlling the amount of said hot regenerated adsorbent so supplied to said drying zone to provide the heat required for vaporization of said vaporizable constituents and also to dilute the carbon content of the mixed adsorbent withdrawn from said drying zone to the range of about 0.2 to 0.6 percent by weight of the adsorbent, and controlling the amount of vaporizable hydrocarbons in the spent adsorbent supplied to said drying zone, by adding vaporizable hydrocarbons to the spent adsorbent to provide an outlet adsorbent temperature from said drying zone within the range about 650–800° F., whereby the mixed adsorbent is maintained below a heat damaging temperature in said regeneration zone by its heat absorption capacity without removal of heat from said regeneration zone by indirect heat exchange.

JOE E. PENICK.

REFERENCES CITED

The following references are of record in the file of this patent:

UNITED STATES PATENTS

| Number | Name | Date |
|---|---|---|
| 2,409,234 | Arveson | Oct. 15, 1946 |
| 2,444,990 | Hemminger | July 13, 1948 |
| 2,451,619 | Hengstebeck et al. | Oct. 19, 1948 |
| 2,480,670 | Peck | Aug. 30, 1949 |